Patented Jan. 17, 1933

1,894,587

UNITED STATES PATENT OFFICE

HERMAN L. HARTENSTEIN, OF CHICAGO, ILLINOIS

MANUFACTURE OF FERTILIZER

No Drawing.   Application filed October 18, 1926. Serial No. 142,192.

It is one of the objects of the present invention to produce manure or fertilizer without extracting or separating the plant food from the peat or muck which is used as a base in the present method.

Acidity is a condition of or common to many types of peat in the bog or swamp, due to the presence of carbon dioxide and colloidal substances of an acid character.

The present invention further contemplates the use of muck or peat, as in many sections in its native state it contains large quantities of carbonic acid frequently in excess of 3%, and also contains humus or organic matter which carries with it a large percentage of nitrogen, usually running from 2% to 4%, as well as excess hydrogen, approximately from 3% to 5%, i. e. hydrogen above or in excess of the amount required to form water, and in obtaining or utilizing the organic nitrogen or potential ammonia contained therein, and hydrogen from the water, by means of certain forms of metallic or semi-pyrophoric iron, aluminum nitride and titanium compounds in the presence of air, nitrogen, hydrogen, oxygen and acids in contact with the humus, organic or vegetable and watery compounds contained in the peat.

Aluminum nitride can be produced with but one-half of the electrical energy required to form calcium carbide or cyanamide, but up to the present time it has had no commercial value for fertilizer purposes, as the soil appears to be unable to transform the nitrogen of the aluminum nitride into fixed ammonia. In fact the nitride is too quickly decomposed by the moist soil, so that most of the ammonia liberated passes off into the air and has no fertilizing action or value.

A further object of this invention contemplates the use of the high water content to good and useful purpose. The nitrides are first decomposed by the moisture and organic matter of the peat, and by reason of the presence of calcium sulfate (gypsum), which may be introduced at any stage, the ammonia is first adsorbed by the water and then enters into direct combination with the calcium sulfate.

The present invention further contemplates putting in an available form, nitrogen which exists and which in its natural organic condition has heretofore been unavailable, and adding thereto aluminum nitrides.

A further object is to provide an improved method of this character embodying the introduction of finely divided iron which is more particularly described and claimed in my co-pending application, Serial No. 142,190, Patent 1,819,164, August 18, 1931.

A still further and a most important object of this invention is to take advantage of and employ the large quantity of water present in peat or muck to good and useful purposes in an economical and efficient manner at a minimum cost, in the natural or native state of the material, the presence of such quantity of water being heretofore held to be useless and detrimental in the former processes for the utilizing of muck or peat.

In carrying this invention into operation the preferred method is preferably carried out in substantially the following manner.

The first step in the method is preferably the introduction or mixing of the semi-pyrophoric finely divided iron, aluminum nitride, either separately or mixed, or combined with the peat or muck which may be accomplished in the best, cheapest and simplest suitable manner.

The muck or peat is employed in this improved method on account of its availability and vast quantities, the great water holding and retaining properties thereof as well as the presence of the humus compounds, organic matter and nitrogen in the peat or muck. Further on account of the acidulous nature thereof some of the water in the presence of acids and organic matter and the semi-pyrophoric iron or aluminum nitride together with gypsum (calcium sulphate) will form fertilizers.

As plants require sulphur in the form of sulfates, it is understood that if after treatment there be any sulfite or sulfide compounds present the transformation of these compounds into sulfates is of vital importance in order to feed the crops.

The compound may be then dried in any suitable manner after which it is ready for use.

This may be accomplished preferably as follows. The above resultant product containing the proper moisture content which is approximately one-half or two-thirds of the amount it will hold without noticeable dripping or draining, and by reason of the increase of temperature generated by the chemical reactions in the mass, preferably a temperature of from 95° to 105° F., the material should be deposited in a suitable bin or receptacle, reasonably compacted, the bottom of the bin having means for admitting air in order to furnish the required aeration or oxygen. The moisture should not exceed two-thirds saturation, the time required for drying is usually from one to four weeks, but this period may be extended without harmful results. If no potassium bearing material has been used, a small amount of limestone or pulverized phosphate rock may be added, but this is not essential unless there is an excess of acid present, an amount of the semi-pyrophoric iron may be added.

This improved method or process may be briefly stated to be as follows.

Dredge, shovel or pump the peat or muck from the bog, place in a suitable container, add the aluminum nitrides, pyrophoric or finely divided iron, or both, then add gypsum (calcium sulfate) at any stage of the process. Then if desired the resulting compound may be dried or used in any suitable manner.

This invention consists in a process of treating aluminum nitride with muck or peat for producing manures or fertilizers. Peat is the more fibrous and usually contains many rootlets which is common to many deposits, but certain deposits have to be subjected to weather conditions to such an extent that the fibres and rootlets are decayed or destroyed; which latter is the preferred and important type to be used in my process, therefore, it is advisable to convert the fibrous or rooty peat into the muck type by digging and piling it on a large pile so that it may be weathered.

Owing to the variation of peat or muck deposits it is not easy to state exact quantities as an illustrative example. However, with the peat or muck on a pile—dry basis which means a water content of upwards of 25% the proportions of peat or muck may be 2000 pounds, semi-pyrophoric or finely divided iron 300 pounds, gypsum or calcium sulfate 700 pounds, and aluminum nitride 1000 pounds: it being understood that such details will vary and should be under proper chemical control.

The time required is usually about one week, which may be shortened by having the minerals in finer particles.

The aluminum nitride, semi-pyrophoric iron, gypsum and muck or peat in their natural wet state are all mixed together and the resultant product is then run through a dryer to remove the excess moisture, if any, and then ground sufficiently fine for use in fertilizer distributing implements, or for incorporating and mixing same with other materials used in making commercial fertilizers.

In the event, however, that there is too much of an excess of water present with the peat or muck, that is a quantity in excess of the amount required for the formation and absorption of the ammonia, then the mass may be drained of the superfluous liquid, in any suitable manner, then add calcium sulfate to the drainage liquid if it contains any ammonia, to form the ammonium sulfate, after which the resultant liquid may be evaporated and the solid matter remaining is delivered over the mass of peat or muck to combine therewith and to be absorbed by the porous mass, adding thereto additional ammonium sulfate, then allow it to have air.

In very cold sections or weather, means should be provided to warm the air to furnish the nitrogen and oxygen required, and after the proper conversion the water which contains the soluble nitrate must be evaporated, does not mean a great excess of water—as film water may hold solubles. In hot dry summer weather this can be done simply by blowing air through and the finished product is disseminated through the peat or muck, all of which may be removed from the bin in any suitable manner such as with a steam shovel.

In the present improved process or method the nitride of aluminum when introduced is decomposed by the combined action of the water and the acidulous humate compounds contained in the peat or muck, the action being that the ammonia is formed and is absorbed, the remaining reactions and steps in the method then being the same as heretofore specified.

It is to be understood that the semi-pyrophoric or finely divided iron and gypsum may be mixed together and the resulting compound may then be mixed with the peat or muck, and also that the clean iron filings or the treated iron filings may be mixed with the gypsum before being introduced into the peat or muck.

The aluminum nitride and titanium compounds may be produced by means of the apparatus shown in my Patents Numbers 819,224; 883,110; 888,610; 946,434; and 946,435, all of which apparatus have continued in practical manufacturing operation up to the present time.

What is claimed as new is:

1. In the manufacture of fertilizer the method of utilizing peat in its natural wet state, which consists in mixing iron and nitride of aluminum with the peat, and then adding to the resultant compound calcium sulphate (gypsum).

2. In the manufacture of fertilizer the method of utilizing peat in its natural wet state, which consists in mixing iron and nitride of aluminum with the peat, then adding calcium sulphate (gypsum), and then drying the mass.

3. In the manufacture of fertilizer the method of utilizing peat in its natural wet state, which consists in mixing semi-pyrophoric iron and nitride of aluminum with the peat, and then adding calcium sulphate (gypsum).

4. In the manufacture of fertilizer the method of utilizing peat or muck in the wet state, which consists in mixing it in a container with semi-pyrophoric or finely divided iron and calcium sulfate or gypsum, then allowing the mixture to stand, and then heating and drying the product.

5. In the manufacture of fertilizer the method of utilizing peat or muck in the wet state, which consists in mixing it in a container with aluminum nitride and calcium sulfate and gypsum, allowing the mixture to stand, and then heating and drying the resultant product.

In testimony whereof I have signed my name to this specification on this 30th day of September, A. D. 1926.

HERMAN L. HARTENSTEIN.